US012779938B2

(12) United States Patent
Favaretto

(10) Patent No.: US 12,779,938 B2

(45) Date of Patent: Nov. 3, 2026

(54) MOTOR VEHICLE

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 201 days.

(21) Appl. No.: 18/899,047

(22) Filed: Sep. 27, 2024

(65) Prior Publication Data

US 2025/0115097 A1 Apr. 10, 2025

(30) Foreign Application Priority Data

Oct. 4, 2023 (IT) ........................ 102023000020547

(51) Int. Cl.

*B60H 1/00* (2006.01)
*B60H 1/24* (2006.01)
*B60J 5/04* (2006.01)
*B62D 25/02* (2006.01)
*B62D 25/06* (2006.01)

(52) U.S. Cl.

CPC ......... *B60H 1/00564* (2013.01); *B60H 1/243* (2013.01); *B60J 5/0413* (2013.01); *B62D 25/025* (2013.01); *B62D 25/06* (2013.01)

(58) Field of Classification Search

CPC ................ B60H 1/00564; B60H 1/243; B60H 2001/00242; B60J 5/0412; B60J 5/0413; B62D 25/025

USPC ............................................... 296/146.1, 208

See application file for complete search history.

(56) References Cited

U.S. PATENT DOCUMENTS 3,455,595 A 7/1969 Wessells et al.
7,044,537 B2 * 5/2006 Schoemann ........... B60H 1/244 296/146.7

FOREIGN PATENT DOCUMENTS

EP 3581411 A1 12/2019
GB 1246803 A 9/1971
JP 2007062700 A 3/2007

OTHER PUBLICATIONS

Italian International Search Report and Written Opinion in IT Application No. 202300020547, mailed May 10, 2024, an English translation attached herewith. (7 pages).

* cited by examiner

*Primary Examiner* — Jason S Daniels

(74) *Attorney, Agent, or Firm* — Leason Ellis LLP

(57) ABSTRACT

A motor vehicle includes a body delimiting a passenger compartment and comprising a side with a door sill, a door and movable, relative to the body, between a closed position, in which it forbids access to the passenger compartment, and an open position, in which it allows access to/exit from the passenger compartment. The vehicle has an air conditioning system that comprises, an inlet duct designed to convey air to be treated; a treatment unit fluidly connected to said inlet duct and configured to treat the air to be treated; and an outlet duct fluidly connected to the treatment unit and designed to convey the treated air; and an outlet vent fluidly connected to the outlet duct and open towards the inside of the passenger compartment to convey the treated air into the passenger compartment. The outlet duct extends inside the door sill or inside the door.

8 Claims, 8 Drawing Sheets

MOTOR VEHICLE

CROSS-REFERENCE TO RELATED APPLICATIONS

This patent application claims priority from Italian patent application no. 102023000020547 filed on Oct. 4, 2023, the entire disclosure of which is incorporated herein by reference.

TECHNICAL FIELD

The present invention relates to a motor vehicle.

BACKGROUND

Motor vehicles are known essentially comprising a body defining a passenger compartment, a pair of front doors hinged relative to the body and a roof delimiting the passenger compartment at the top.

The passenger compartment defines at least one pair of seats for a driver and a passenger.

Each front door is, in a known manner, movable between:

a closed position, in which it forbids access to and exit from the passenger compartment and laterally delimits it at a normal travel direction of the motor vehicle; and an open position, in which it allows access to and exit from the passenger compartment.

Motor vehicles further comprise, in a known manner, an air conditioning system, also known as HVAC system, configured to heat, ventilate and air-condition the air inside the passenger compartment and thus increase the comfort of the occupants of the passenger compartment.

Very briefly, the air conditioning system comprises, in a known manner:

a plurality of inlet ducts designed to convey air collected from the outside of the passenger compartment;

a treatment unit fed by the inlet ducts with the air to be treated and configured to treat the air so as to bring it to the desired humidity and temperature values; and a plurality of outlet ducts designed to make the air treated by the treatment unit available to a plurality of vents open towards the inside of the passenger compartment.

In the solution illustrated in patent application EP-A-3581411 by the same Applicant, the treatment unit is arranged behind the driver's seat.

The outlet ducts extend inside the roof of the motor vehicle along a longitudinal median axis of the motor vehicle parallel to the travel direction thereof, and end in the vents also arranged in the area of the roof so as to be close to the passenger and the driver.

Although effective, the previously illustrated known solutions are susceptible of improvements, for example with regard to the reduction in the constraints imposed on the design of the motor vehicle by the need to accommodate the air conditioning system and/or with regard to the improvement of the thermal comfort of the occupants of the motor vehicle.

SUMMARY

The object of the present invention is to manufacture a motor vehicle, which allows satisfying at least one of the aforementioned needs in a simple and cost-effective manner.

The aforementioned object is achieved by the present invention, as it relates to a motor vehicle according to what is described herein and set forth in the claims.

BRIEF DESCRIPTION OF THE DRAWINGS

In order to better understand the present invention, a preferred embodiment is described in the following, by way of mere non-limiting example and with reference to the accompanying drawings, wherein.

DESCRIPTION OF EMBODIMENTS

Figure 1:
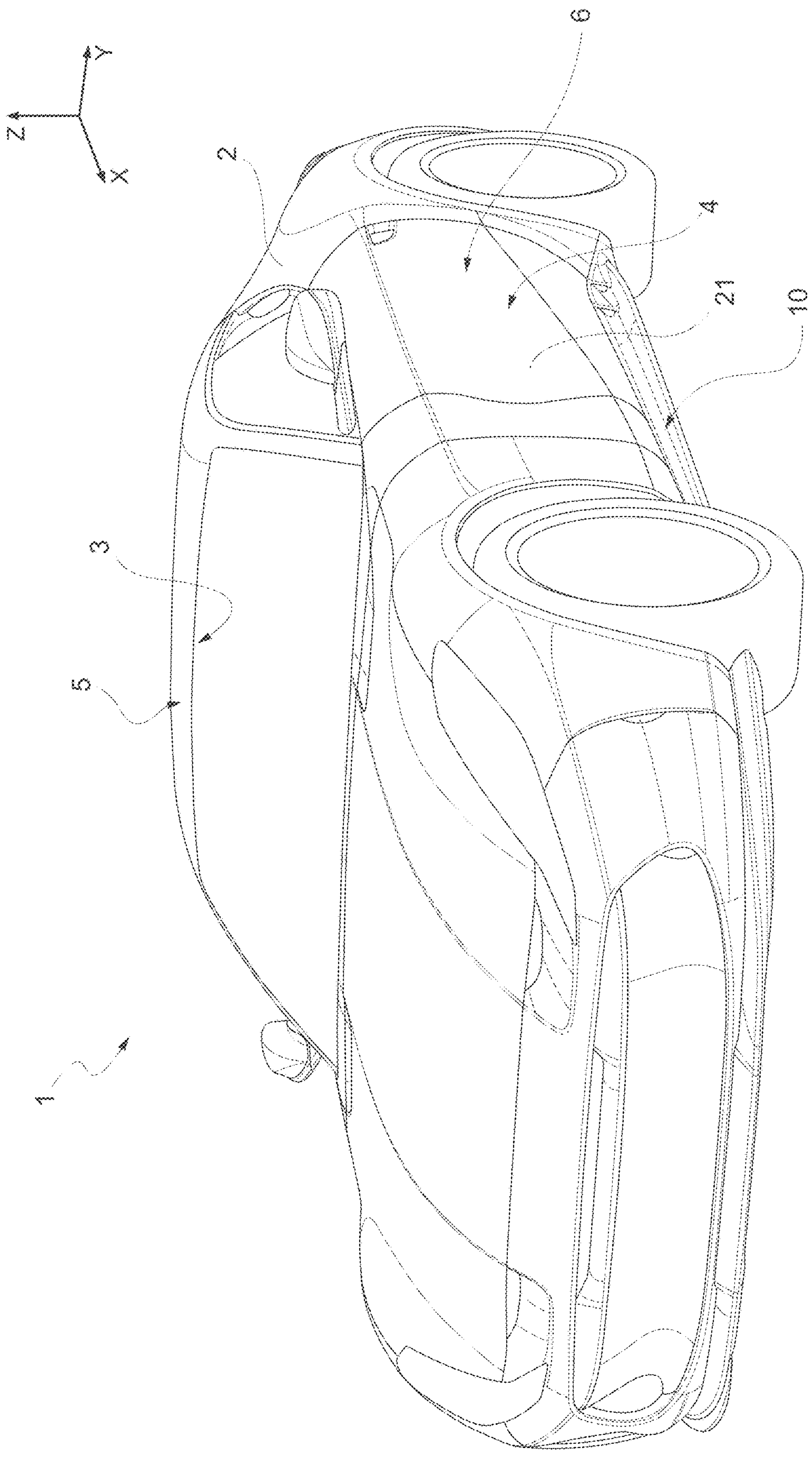
FIG. 1 is a perspective view of a first embodiment of a motor vehicle manufactured according to the teachings of the present invention.

With reference to FIG. 1, reference numeral 1 indicates a motor vehicle.

More specifically, the motor vehicle 1 comprises:

a body 2 delimiting a passenger compartment 3; and a pair of doors 4 hinged to the body 2 and a roof 5.

The body 2 further comprises a pair of sides 6 adjacent respective doors 4.

It is further possible to define:

a longitudinal axis X integral with the motor vehicle 1, arranged, in use, horizontal and parallel to a normal travel direction of the motor vehicle 1;

a transverse axis Y integral with the motor vehicle 1, arranged, in use, horizontal and orthogonal to the axis X; and an axis Z integral with the motor vehicle 1 arranged, in use, vertical and orthogonal to the axes X, Y.

It is further specified that in the following of the present description, expressions such as "above", "at the top", "under", "at the bottom", "in front of", "behind" and the like are utilized with reference to a normal travel condition of the motor vehicle 1 in which the latter travels parallel to the axis X.

The motor vehicle 1 further comprises a seat 8.

Figure 4:
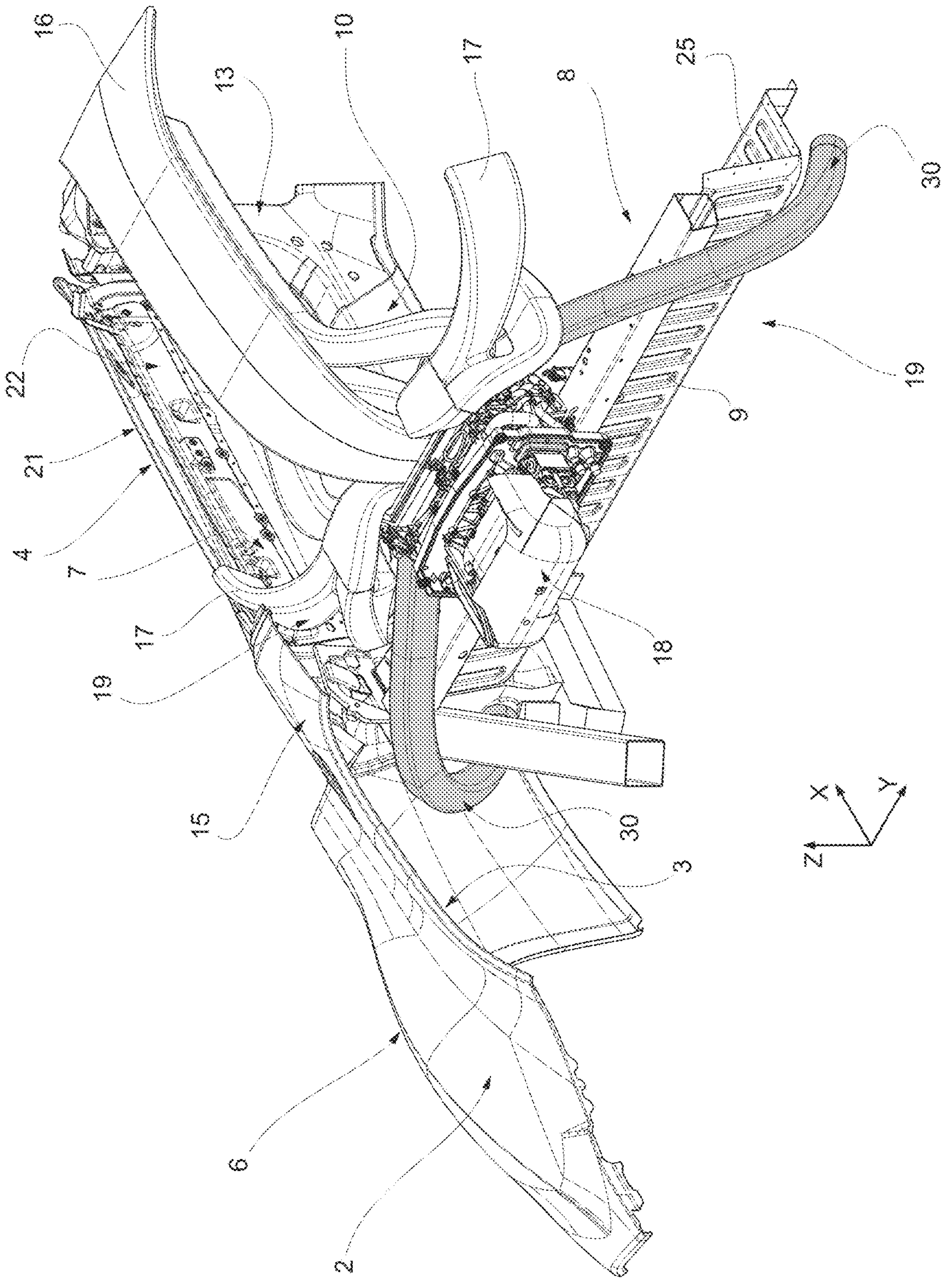
FIG. 4 is a perspective view of the motor vehicle of Figures from 1 to 3 with the door closed, on a greatly enlarged scale and with parts removed for clarity.
Figure 5:
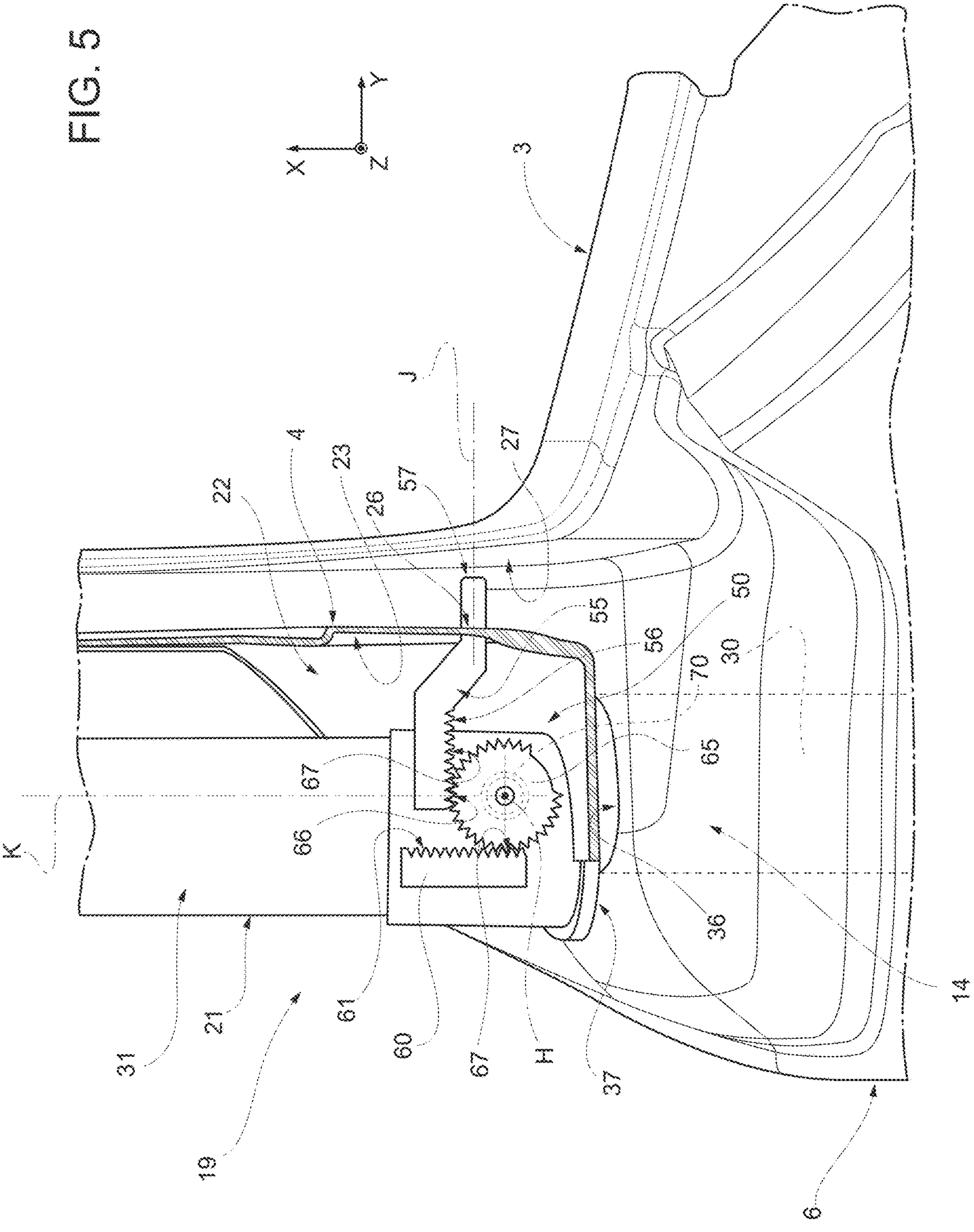
FIGS. 5 and 6 illustrate a top view, on a greatly enlarged scale, of second details of the motor vehicle of Figures from 1 to 4 with the door open and closed, respectively.

The seat 8 is illustrated in FIGS. 4 and 5 limitedly to a backrest 9 and a sitting surface 25.

Figure 2:
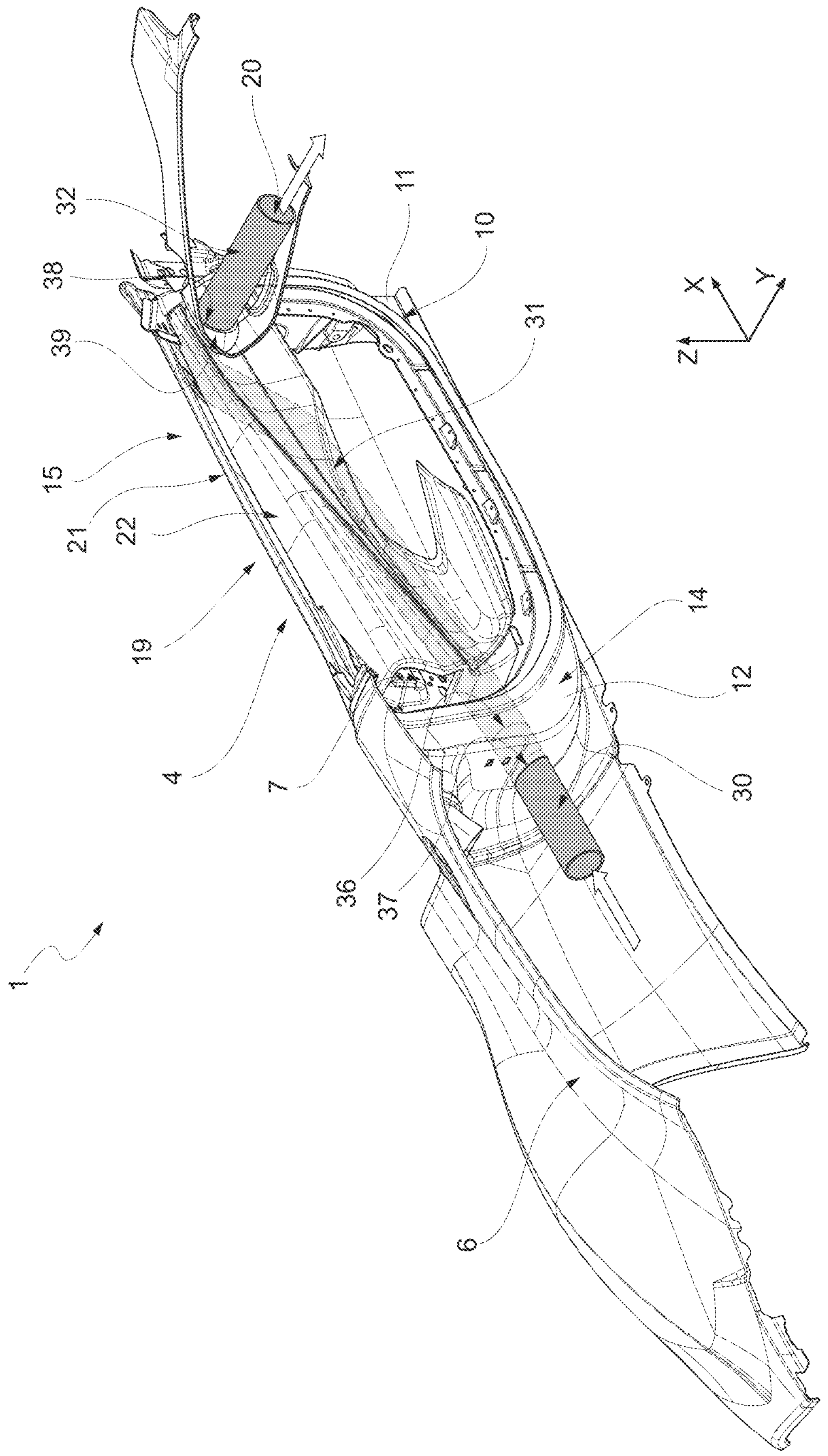
FIG. 2 is a perspective view of the first embodiment of the motor vehicle with a closed door, on a greatly enlarged scale and with parts removed for clarity.
Figure 3:
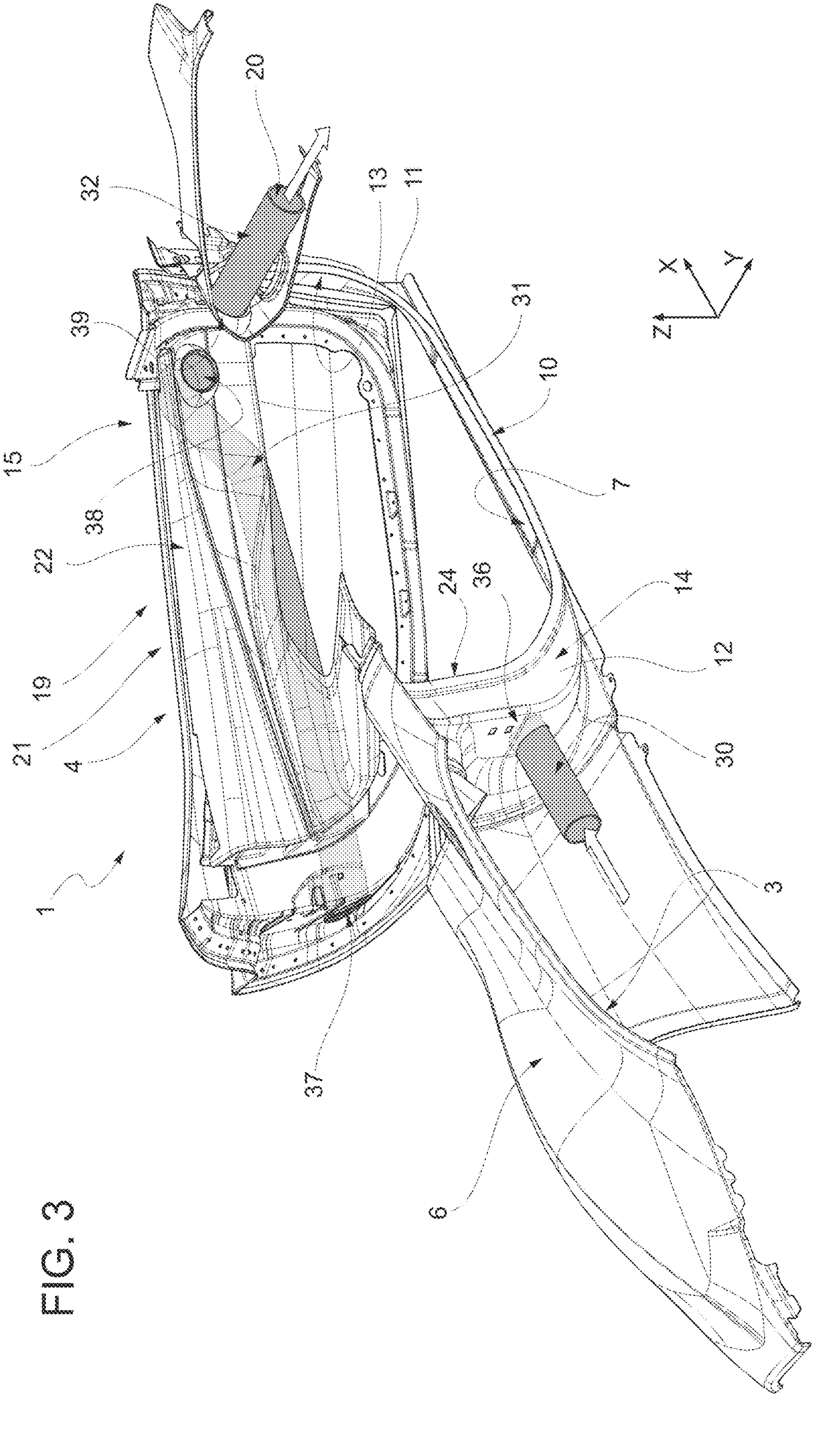
FIG. 3 is a perspective view of the first embodiment of the motor vehicle with the door open, on a greatly enlarged scale and with parts removed for clarity.

Each door 4 is movable between:

a closed position, in which it cooperates with the body 2 and the roof 5 in delimiting the passenger compartment 3, defines a prolongation of the relative side 6 and forbids access to/exit from the passenger compartment 3 (FIG. 2); and an open position, in which it is spaced apart from the relative side 6 and allows access to and exit from the passenger compartment 3 (FIG. 3).

Each side 6 comprises (FIGS. 2 and 3) a frame 7 delimiting an opening 24 engaged by the relative door 4 when arranged in the closed position and which allows access to/exit from the passenger compartment 3 when the door 4 is in the open position.

With reference to FIG. 3, the frame 7 of each side 6 is delimited by:

- a pair of uprights 13, 14, respectively front and rear, spaced apart from each other along the axis X, and having a mainly vertical development; and
- a door sill 10 mainly having a horizontal development and joined, in the area of its opposite longitudinal ends 11, 12, to respective uprights 13, 14.

In a known manner, the door 4 is hinged around the upright 13 parallel to the axis Z and rotates around the upright 13 for moving between the open position (FIG. 3) in which it is rotated relative to the upright 14 and the closed position (FIG. 2) in which it strikes against the upright 14.

The upright 14 further comprises a wall 27 arranged facing the door 4 when the latter is arranged in the closed position.

The door 4 further comprises:

- an outer wall 21 relative to the passenger compartment 3;
- a panel 23 defining an inner wall of the door 4 relative to the passenger compartment 3 opposite the outer wall 21, and having a mainly parallel development facing the outer wall 21; and
- a compartment 22 delimited between the aforementioned outer wall 21, panel 23 and uprights 13, 14.

Each door sill 10 delimits the respective frame 7 at the bottom and is arranged under the relative door 4 when the latter is in the corresponding closed position.

The motor vehicle 1 further comprises an air conditioning system 15, also known as HVAC system, configured to heat, ventilate and air-condition the air inside the passenger compartment 3 and thereby increase the comfort of the occupants of the passenger compartment 3.

Very briefly, the air conditioning system 15 comprises (FIG. 4):

- a plurality of inlet ducts 16, 17 designed to convey air collected from the outside of the passenger compartment 3;
- a treatment unit 18 fed by the inlet ducts 16, 17 with the air to be treated and configured to treat the air so as to bring it to the desired humidity and temperature values; and
- a pair of outlet ducts 19 designed to make the air treated by the treatment unit 18 available to a plurality of vents 20 open towards the inside of the passenger compartment 3.

In the illustrated case, the inlet duct 16 is integrated in the roof 5 and extends longitudinal to the axis X in a median position between the sides 6.

The inlet ducts 17 extend symmetrically relative to the axis X and converge towards the treatment unit 18.

The treatment unit 18 is arranged behind the seat 8.

The outlet ducts 19 extend symmetrical to the axis X and diverge proceeding from the treatment unit 18 towards the relative vents 20.

Advantageously, the outlet ducts 19 at least partly extend inside the respective doors 4.

In the following of the present description reference will be made to one single outlet duct 19 and to the relative door 4 and side 6, being the outlet ducts 19, the doors 4 and the sides 6 identical to one another.

More specifically, the outlet duct 19 comprises, proceeding from the treatment unit 18 towards the vent 20:

- an end portion 30 arranged behind the door 4 arranged in the closed position;
- a main portion 31 accommodated inside the door 4, in particular in the compartment 22; and
- an end portion 32 arranged in front of the door 4 arranged in the closed position.

More specifically, the end portion 30 comprises an outlet 36 defined by the upright 14, opposite the treatment unit 18 and open towards the opening 24.

The main portion 31 comprises, in turn:

- an inlet 37; and
- an outlet 38 opposite the inlet 37.

As more specifically described in the following of the present description, the main portion 31 is movable relative to the panel 23.

The end portion 32 comprises an inlet 39 defined by the upright 13, open towards the opening 24 and opposite the vent 20.

When the door 4 is in the closed position, the outlet 36 of the end portion 30 is in fluid-tight fluid communication with the inlet 37 of the main portion 31, and the outlet 38 of the main portion 31 is in fluid-tight fluid communication with the inlet 39 of the end portion 32, so as to arrange the vent 20 in fluid communication with the treatment unit 18.

In other words, the outlet duct 19 does not have any interruptions.

When the door 4 is in the open position, the outlet 36 of the end portion 30 is away from the inlet 37 of the main portion 31, and the outlet 38 of the main portion 31 is away from the inlet 39 of the end portion 32, so as to fluidly insulate the vent 20 from the treatment unit 18.

Preferably, when the door 4 is in the open position, the operation of the treatment unit 18 is stopped so as to prevent the treated air from coming out of the passenger compartment by means of the outlet 36 of the end portion 30.

Alternatively, when the door 4 is in the open position, the outlet 36 of the end portion 30 is fluid-tight covered by a shutter.

The main portion 31 of the outlet duct 19 and the panel 23 are movable integral with each other relative to the side 6, during the movement of the door 4 between the open and closed positions.

The main portion 31 of the outlet duct 19 is further mounted in a movable manner relative to the panel 23.

The motor vehicle 1 further comprises an interface 50 carried by the door 4.

The interface 50 is designed to allow the moving away of the main portion 31 of the outlet duct 19 from the panel 23 when the door 4 is moved away from the upright 13 for being moved in the open position, so as to arrange in a staggered position with respect to each other the outlet 36 of the end portion 30 and the inlet 37 of the main portion 31 (FIG. 5).

Figure 6:
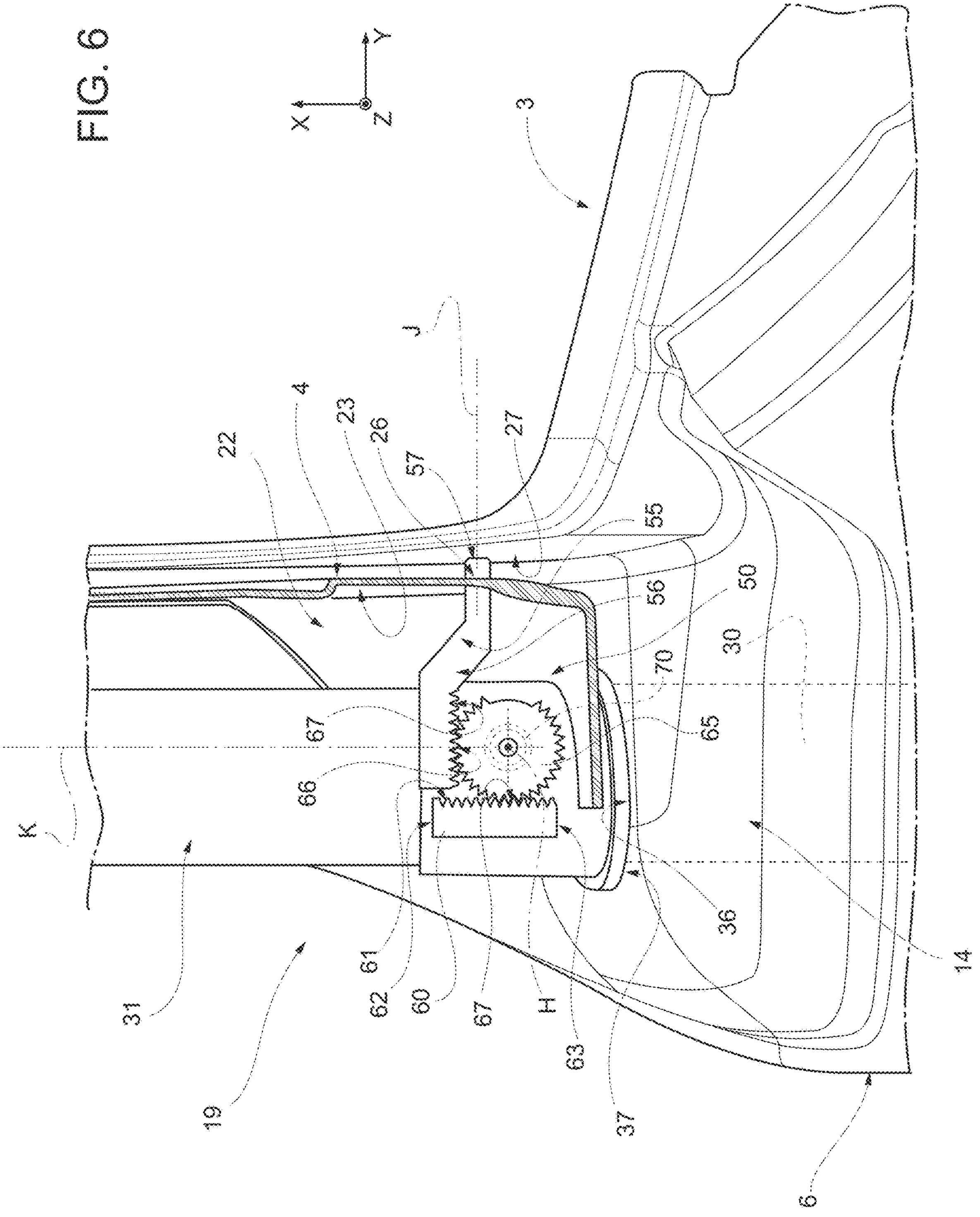

The interface 50 is further designed to allow the approaching of the main portion 31 of the outlet duct 19 to the panel 23 and to the side 6 when the door 4 is arranged in the closed position, so as to arrange in fluid-tight fluid communication the outlet 36 of the end portion 30 and the inlet 37 (FIG. 6).

More specifically, the interface 50 comprises, with reference to FIGS. 5 and 6, in turn:

- a gear wheel 65 mounted in a rotatable manner relative to the panel 23 around an axis H parallel to the axis Z;
- an arm 55 slidable relative to the outlet duct 19 and the panel 23 along an axis J orthogonal to the axis H, and provided with a rack 56 meshing with a toothed segment 66 of the gear wheel 65; and
- an arm 60 fixed to the main portion 31 and provided with a rack 61 meshing with a toothed segment 67 distinct from the toothed segment 66 of the gear wheel 65.

It is important to highlight that the segments 66, 67 are instantly distinct from each other, i.e. indicate the toothed segments of the gear wheel 65 which, in a given instant, mesh with the racks 56, 61, respectively.

The interface 50 further comprises a torsion spring 70 interposed between the panel 23 and the gear wheel 65.

The gear wheel 65 and the rack 61 are accommodated in the compartment 22.

The axis J is parallel to the axis Y and thus orthogonal to the axis Z.

The arm 55 further comprises an end portion 57 opposite the rack 56.

The end portion 57 passes through with clearance a through opening 26 of the panel 23. In particular, the opening 26 is through-passing parallel to the axis J.

When the door 4 is in the closed position, the end portion 57 is in contact with the side 6.

The opening 26 faces, parallel to the axis J, the wall 27 of the side 6.

The segment 66 and the rack 56 are configured such that the rotation of the gear wheel 65 in a first (second) sense determines the relative moving away (approaching) between the axis H from the end portion 57 and the rack 56.

The spring 70 is elastically preloaded so as to exert an elastic torque in the first sense, clockwise in the case illustrated in FIG. 6.

When the door 4 is in the closed position, the spring 70 is compressed.

The rack 61 comprises, in turn, a pair of ends 62, 63 opposite each other and arranged on the side of respective uprights 13, 14.

The rack 61 further extends along an axis K of its own orthogonal to the axes I, J.

The segment 67 and the rack 56 are configured such that the rotation of the gear wheel in the first (second) sense determines the relative moving away (approaching) between the end 63 of the rack 56 and the axis H of the gear wheel 65.

The arm 60 and thus the main portion 31 are movable relative to the panel 23, following the meshing of the gear wheel 65 with the rack 61 between:

- a first position (illustrated in FIG. 7) assumed when the door 4 is closed and in which the end 62 of the rack 60 is at a first distance from the axis H of the gear wheel 65 parallel to the axis K; and
- a second position (illustrated in FIG. 6) assumed when the door 4 is open and in which the end 62 of the rack is at a second distance greater than the first distance from the axis H of the gear wheel 65 parallel to the axis K.

Consequently, when the gear wheel 65 rotates in the first sense around the axis H and the end portion 57 strikes against the wall 27 of the side 6, the panel 23 moves away from the wall 27 integral with the gear wheel 65 rotating around the axis Z in the first sense and the main portion 31 moves towards the first position.

On the contrary, when the gear wheel 65 rotates in the second sense around the axis H and the end portion 57 strikes against the wall 27 of the side 6, the panel 23 approaches the wall 27 integral with the gear wheel 65 rotating around the axis Z in the second sense and the main portion 31 moves towards the second position.

The vent 20 is arranged at the side of the seat 8, in the illustrated case.

In particular, the seat 8 is interposed along the axis Y between the vents 20.

Figure 7:
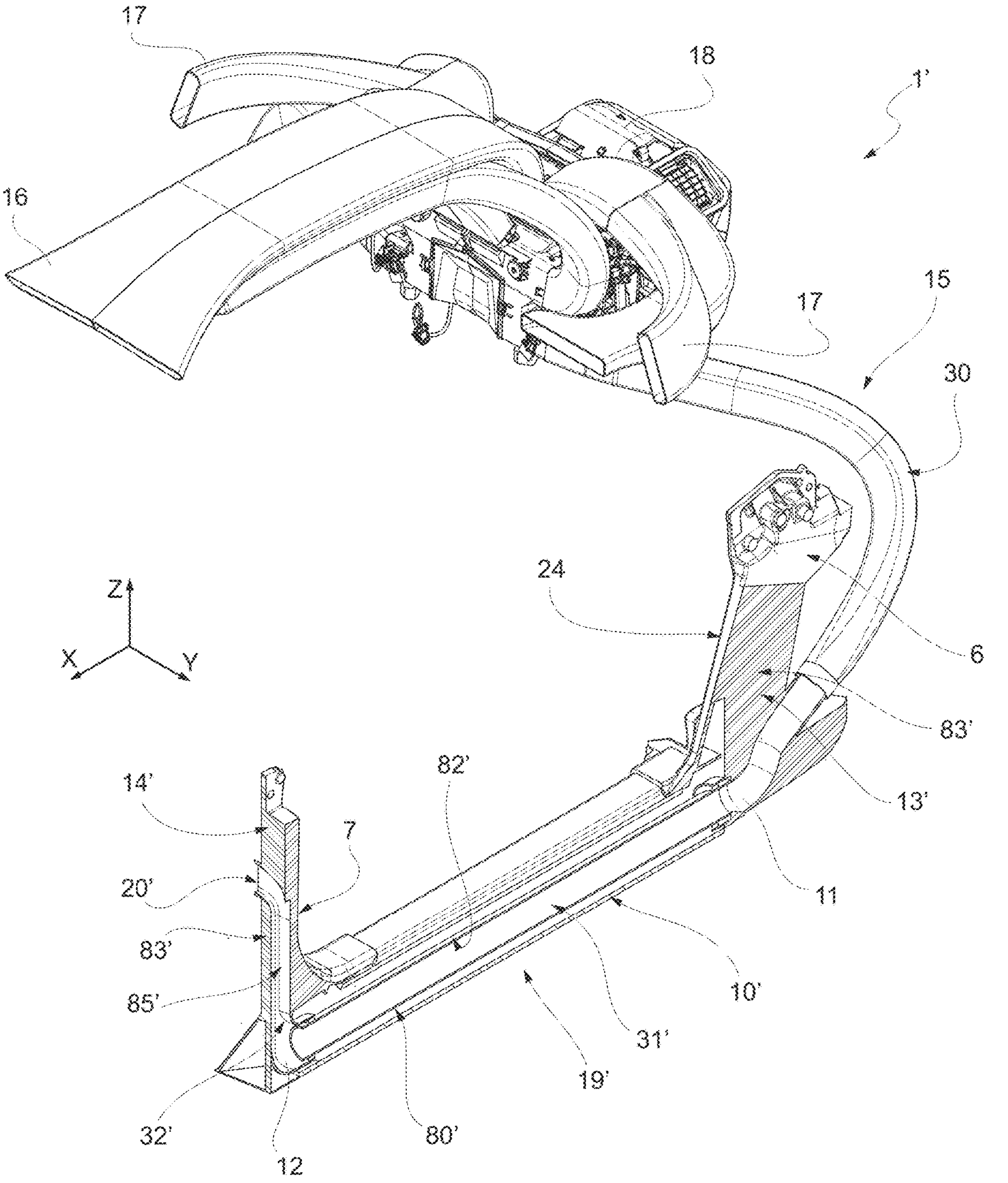
FIGS. 7 and 8 are perspective views of some details of a second embodiment of the motor vehicle shown only for illustrative purposes and with parts removed for clarity.

The operation of the motor vehicle 1 is described starting from a condition illustrated in FIGS. 4 and 5 and 7, wherein the door 4 is closed and the air conditioning system 15 is activated.

In such condition, the air to be treated is conveyed from the outside of the passenger compartment towards the treatment unit 18 by means of the inlet ducts 16, 17.

The treatment unit 18 treats such air and makes it available to the outlet ducts 19.

The operation of the motor vehicle 1 is illustrated in the following of the present description with reference to only one outlet duct 19 and to the relative door 4 and side 6, being the outlet ducts 19 identical to one another.

As is illustrated in FIGS. 3 and 6, in such condition, the outlet 36 of the end portion 30 is in fluid-tight fluid communication with the inlet 37 of the main portion 31. Similarly, the outlet 38 of the main portion 31 is in fluid-tight fluid communication with the inlet 39 of the end portion 32. In such condition, the spring 70 is compressed and exerts an elastic torque in the first sense on the gear wheel 65 and the end portion 57 strikes against the wall 27 of the side 6. The arm 60 is in the first position in which the end 62 of the rack 61 is at the first distance from the panel 23.

The spring 70 is elastically deformed due to the fact that the door 4 is closed.

If it is desired to arrange the door 4 in the open position, the operation of the treatment unit 18 is stopped. Alternatively, the outlet 36 is fluid-tight covered by means of a shutter.

The door 4 is arranged in the open position, rotating the door 4 from the upright 14 parallel to the axis Z.

Such rotation determines the integral rotation of the panel 23 and of the main portion 31 of the outlet duct 19 relative to the wall 27 of the side 6.

Simultaneously, the spring 70 returns in the non-deformed position, exerting an elastic torque on the gear wheel 65 in the first sense around the axis H. Owing to the fact that the end portion 57 strikes against the wall 27, such clastic torque determines the rotation of the gear wheel 65 in the first sense and the translation of the gear wheel 65 relative to the rack 56 parallel to the axis J and on the side opposite the wall 27.

Simultaneously, thanks to the meshing between segment 67 and rack 61, the arm 60 and the main portion 31 of the outlet duct 19 move in the position in FIG. 6 in which the end 62 of the rack 61 is at the second distance greater than the first distance from the panel 23.

Consequently, the arm 60 and the main portion 31 further rotate around the axis Z further moving away from the upright 14 and the wall 27 of the side 6, up to arranging the outlet 36 of the end portion 30 spaced apart from the inlet 37 of the main portion 31.

At this point, the further manual moving away of the door 4 from the side 6 determines the integral motion of the assembly formed by the panel 23, the main portion 31 of the outlet duct 19 and the interface 50.

When the door 4 is manually brought back into the closed position, initially the end portion 57 is led to strike against the side 27 and then the gear wheel 65 rotates around the axis H in the second sense.

The rotation of the gear wheel 65 in the second sense determines:

- the translation along the axis J of the gear wheel 65 relative to the rack 56 and towards the side 27;
- the elastic compression of the spring 70; and thanks to the meshing between toothed segment 67 and rack 61, the return of the arm 60 again in the first position in which the end 62 is at the first distance from the axis H.

The outlet 36 of the end portion 30 is again further in fluid-tight fluid communication with the inlet 37 of the main portion 31. Thanks to the fact that the door 4 is closed, also the outlet 38 of the main portion 31 is in fluid-tight fluid communication with the inlet 39 of the end portion 32.

It is thus possible to let treated air again inside the passenger compartment 3 by means of the vent 20.

Figure 8:
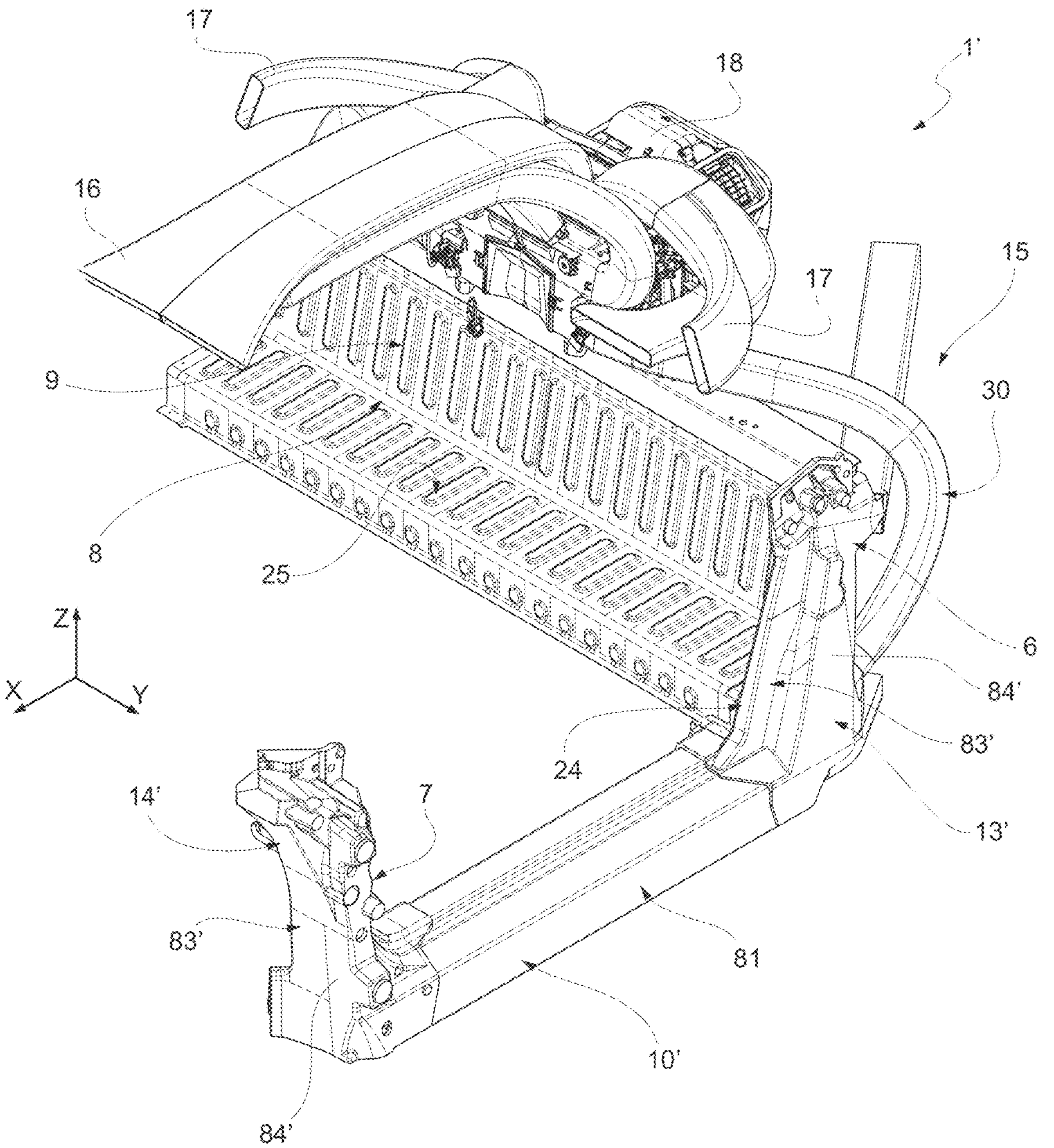

With reference to FIGS. 8 and 9, a motor vehicle 1' is illustrated according to a further embodiment not belonging to the invention.

The motor vehicle 1' is similar to the motor vehicle 1 and it will be described in the following only with regard to what differs from the latter; identical or equivalent parts of the motor vehicles 1, 1' will be indicated, where possible, by the same reference numerals.

More specifically, the outlet ducts 19' differ from the outlet ducts 19 due to the fact that the main portions 31' are accommodated inside door sills 10' of respective doors 4.

In particular, the door sills 10' differ from the door sill 10 due to the fact that they each comprise a pair of section bars 80', 81' coupled to each other and defining between each other a compartment 82' accommodating the main portion 31' of the respective outlet duct 19'.

Similarly, the uprights 13', 14' differ from the respective uprights 13, 14 due to the fact that they each comprise a pair of section bars 83', 84' coupled to each other and defining between each other a respective compartment 85'.

In particular, the compartment 85' of each upright 13' accommodates the outlet 36 of the end portion 30 and the inlet 37 of the main portion 30 of the relative outlet duct 19'.

The compartment 85' of each upright 14' accommodates the main portion 31' and defines the vent 20' of the relative outlet duct 19'.

The outlet ducts 19' finally differ from the outlet ducts 19 due to the fact that they do not comprise the interfaces 50.

Based on an examination of the motor vehicle 1 manufactured according to the present invention, the advantages that it allows obtaining are evident.

In particular, the outlet duct 19 extends inside the door 4.

In such manner, the roof 5 is no longer intended to accommodate the outlet ducts 19 and can thus be configured with greater flexibility and with less constraints relative to the solutions of known type and described in the introductory part of the present description.

The vents 20 can further be easily arranged in the proximity of the occupants of the passenger compartment 3 without requiring particularly and tortuous ducts which would generate unavoidable charge losses in the treated air, thereby increasing the thermal comfort perceived by the occupants of the motor vehicle.

The interface 50 allows:

arranging the outlet 36 of the end portion 30 in fluid-tight fluid communication with the inlet 37 of the main portion 31, when the door 4 is in the closed position (FIG. 6); and moving the main portion 31 relative to the end portion 30, when the door 4 is in the open position (FIG. 5).

Finally, it is clear that modifications and variations can be made to the motor vehicle 1 described and illustrated herein, which do not depart from the scope of protection defined by the claims.

The invention claimed is:

1. A motor vehicle (1) comprising:

a body (2) delimiting a passenger compartment (3) and defining a side (6) with a door sill (10);

at least one door (4) movable, relative to said side (6), between a closed position, in which it forbids access to said passenger compartment (3), and an open position, in which it allows access to/exit from said passenger compartment (3); said door (4) being arranged, in use, above said door sill (10) with reference to a normal travel direction of said motor vehicle (1); and an air conditioning system (15) designed to let treated air into said passenger compartment (3);

said air conditioning system (15) comprising, in turn:

at least one inlet duct (16, 17) designed to convey air to be treated;

a treatment unit (18) fluidly connected to said inlet duct (16, 17) and configured to treat said air to be treated;

at least one outlet duct (19) fluidly connected to said treatment unit (18) and designed to convey said treated air; and at least one outlet vent (20) fluidly connected to said outlet duct (19) and open towards the inside of said passenger compartment (3) so as to convey said treated air into the passenger compartment (3);

said body (2) comprising a door sill (10) arranged, in a normal operating condition of said motor vehicle (1), under said at least one door (4);

said outlet duct (19) extending, at least partly, inside said door sill (10) or inside said door (4);

said outlet duct (19) comprising, in turn:

a main portion (31) accommodated inside said door sill (10) or said door (4);

a first end portion (30) interposed between said treatment unit (18) and said main portion (31) and arranged behind said main portion (31) with reference to said normal travel direction of said motor vehicle (1); and a second end portion (32) interposed between said main portion (31) and said vent (20) and arranged in front of said main portion (31) with reference to said normal travel direction of said motor vehicle (1);

characterized in that said body (2) comprises a pair of sides (6) each arranged adjacent to and behind a respective said door (4) arranged in the corresponding said closed position with reference to said normal travel direction;

said first end portion (30) of said outlet duct (19) being arranged inside said side (6) and said main portion (31) of said outlet duct (19) being arranged inside said door (4) in front of said first end portion (30) with reference to said normal travel direction;

said motor vehicle (1) comprising, for each door (4):

a panel (23) arranged on the side of the respective said side (6) and movable relative to the respective said side (6); and an interface (50) designed to allow said main portion (31) to move relative to said panel (23) following the movement of said door (4), in use, between the respective said closed position and said open position;

said interface (50) comprising, in turn:

a first element (55) movable relative to said main portion (31) and to said panel (23) from and to said side (6);

a second element (60) fixed to said main portion (31); and a third element (65) operatively connected to said first element (55) and said second element (60) and fixed to said panel (23).

2. The motor vehicle according to claim 1, characterized in that it further comprises:

a seat (8) arranged inside said passenger compartment (3); and a roof (5) defined by said body (2) and delimiting said passenger compartment (3) at the top with reference to said normal travel direction;

said treatment unit (18) being arranged behind said seat (8) with reference to said normal travel direction;

at least one said inlet duct (16) being arranged inside said roof (5).

3. The motor vehicle according to claim 1, characterized in that said air conditioning system (15) comprises a pair of said outlet ducts (19) arranged inside respective said doors (4).

4. The motor vehicle according to claim 1, characterized in that it comprises elastic means (70) designed to at least indirectly load said first element (55) towards a position in which it strikes against said side (6), when said door (4) is closed.

5. The motor vehicle according to claim 4, characterized in that said elastic means (70) are interposed between said panel (23) and said third element (65), are elastically non-deformed, in use, when said door (4) is in said open position and are elastically deformed when said door (4) is in said closed position.

6. The motor vehicle according to claim 1, characterized in that said panel (23) comprises an opening (26), through which said first element (55) can pass so as to allow said first element (55) to move from and to said side (6).

7. The motor vehicle according to claim 1, characterized in that:

said first element (55) comprises a first rack (56) sliding relative to said panel (23);

said second element (60) comprises a second rack (61) fixed to said main portion (31); and said third element (65) is a gear wheel hinged to said panel (23) and meshing with said first element (55) and said second element (60) in the area of a first toothed segment (67) and of a second toothed segment (66), respectively, distinct from each other.

8. The motor vehicle according to claim 1, characterized in that said door (4) further comprises a compartment (22) accommodating said main portion (31) and said second element (60);

said compartment (22) being delimited by said panel (23) and being arranged on the opposite side of said panel (23) relative to said side (6).

* * * * *